May 25, 1926.
W. G. WILSON
LOOSE SEAT GATE VALVE
Filed May 2, 1922
1,586,345
5 Sheets-Sheet 1
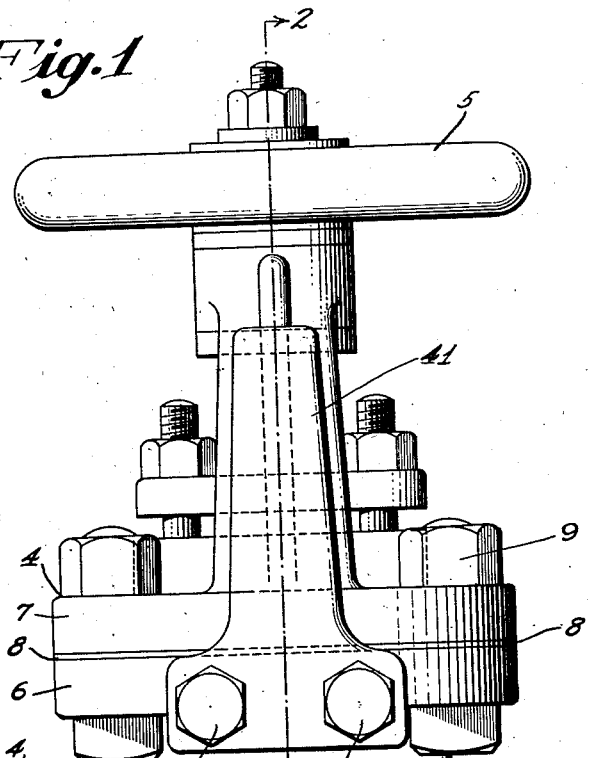
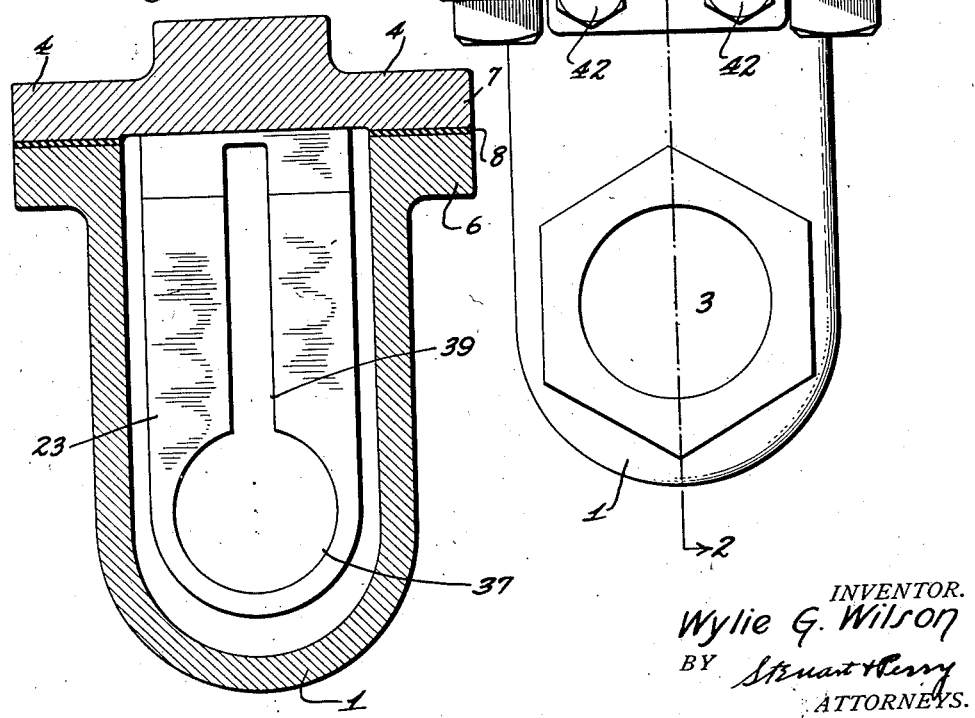
INVENTOR.
Wylie G. Wilson
BY
ATTORNEYS.

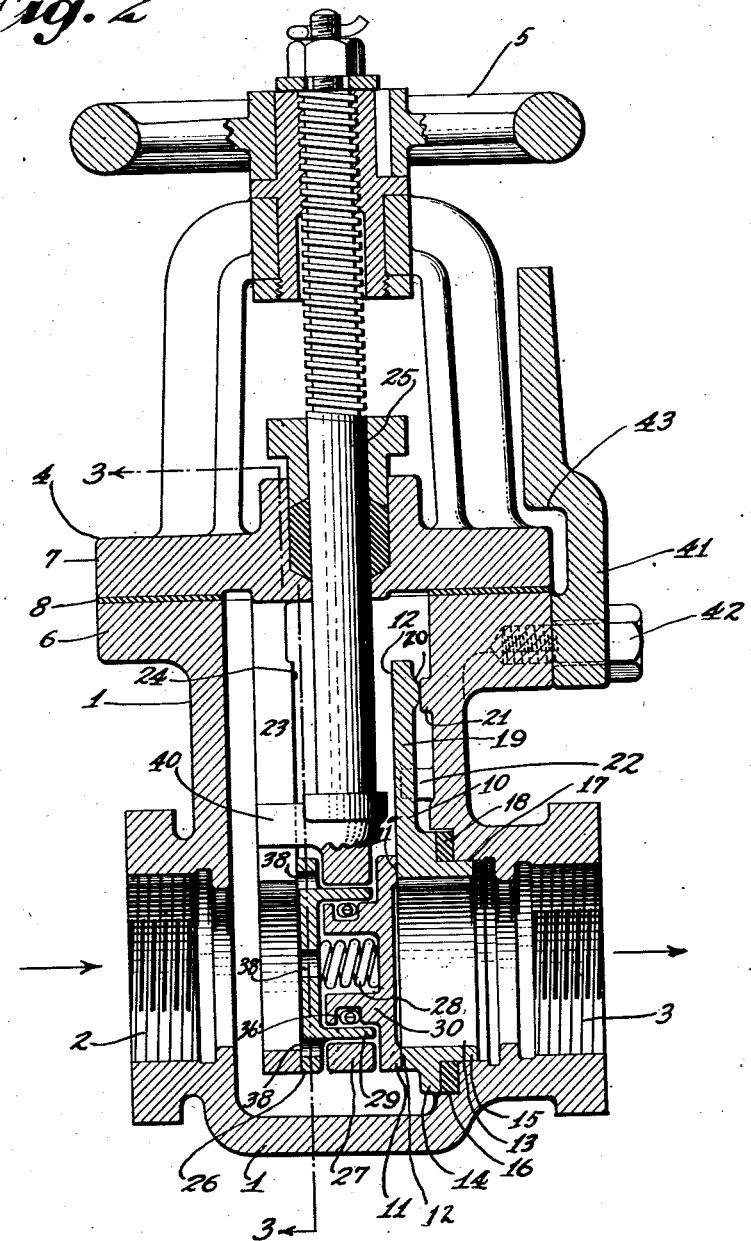

May 25, 1926.

W. G. WILSON 1,586,345

LOOSE SEAT GATE VALVE

Filed May 2, 1922

INVENTOR.
Wylie G. Wilson
BY
ATTORNEYS.

May 25, 1926.  
W. G. WILSON  
LOOSE SEAT GATE VALVE  
Filed May 2, 1922
1,586,345
5 Sheets-Sheet 4
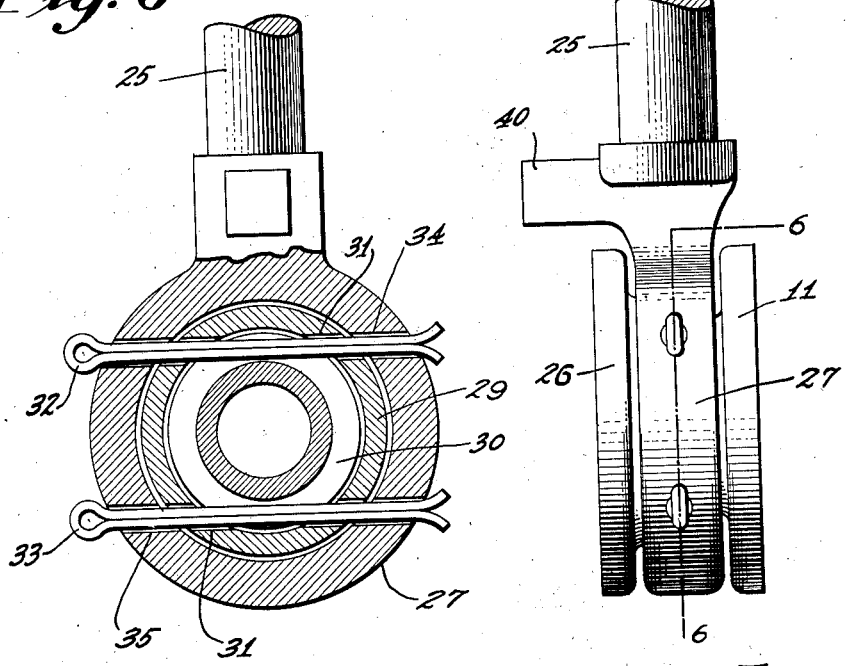
Fig. 6
Fig. 5
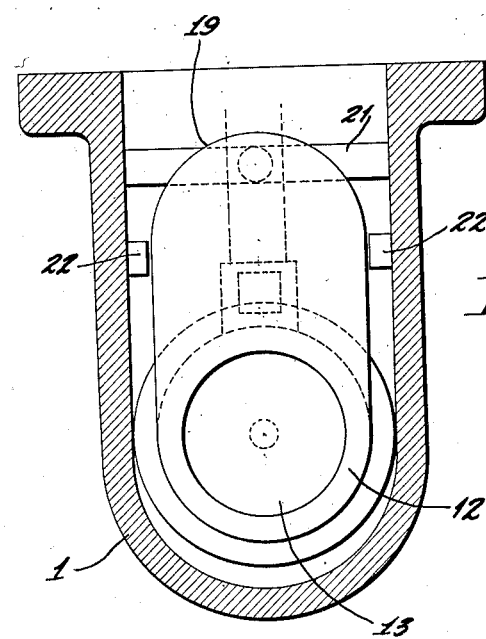
Fig. 7
INVENTOR.
Wylie G. Wilson
BY Stuart & Perry
ATTORNEYS.

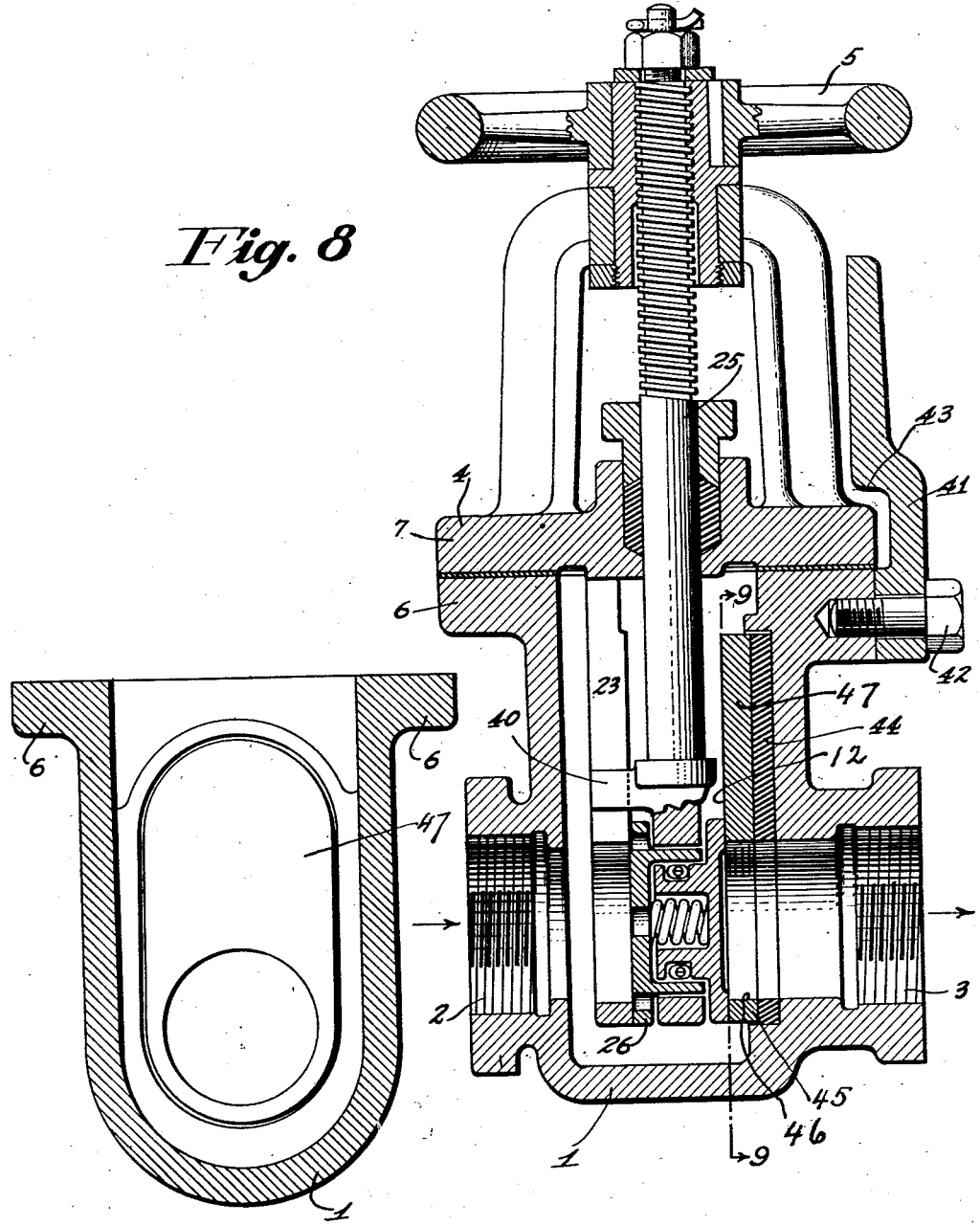

Patented May 25, 1926.

1,586,345

UNITED STATES PATENT OFFICE.

WYLIE G. WILSON, OF JERSEY CITY, NEW JERSEY, ASSIGNOR TO LOOSE SEAT VALVE COMPANY, A CORPORATION OF DELAWARE.

LOOSE-SEAT GATE VALVE.

Application filed May 2, 1922. Serial No. 557,868.

This invention relates to an improvement in valves, and particularly in that class of valves known as "gate valves," and has for its object the providing of means whereby such valves may be conveniently and expeditiously repaired, together with means cooperating to establish and maintain a more perfect seal between the sealing element of the valve and its seat, the latter being accomplished more particularly by providing means by which the sealing element may be constantly maintained in contact with the surface over which it is mounted to slide, thus avoiding injury to the sealing faces by reason of the interposition of scale or grit which is liable to cut such faces.

Gate valves of the type referred to are frequently used in main pipe lines and consequently it is important that repairs to the same should be expeditiously accomplished. In valves of this nature it is frequently necessary in order to make a repair to break the main pipe line and disassemble therefrom the valve casing, thus entailing considerable delay and expense not only in the matter of making the repair but also in the suspension of operation due to the removal of the valve from the main pipe line. One of the advantages which this invention is intended to accomplish is to so construct the valve that it may be speedily repaired and that this repair may be accomplished by unskilled labor.

Deterioration in valves of this nature frequently occurs by reason of the fact that grit or slag is found in the fluid passing through the valve and becomes interposed between the sealing member and its seat. Thus in the operation of the valve the sealing surfaces are liable to be cut by such grit, leaving furrows in the surface of the valve faces, thus more or less breaking the seal. In like manner, many of such valves are constructed with a wedge formation so that when the valve is driven home a seizure of the metal elements takes place which when again broken to open the valve operates in like manner to deface the fine surfaces which form the seal. In a valve constructed according to this invention means are provided by which the sealing element of the valve is kept constantly in contact with not only the valve sealing face but also with an extension of such face during the operation of opening and closing the valve, so that the sealing face of the active valve element is constantly maintained by elastic pressure in contact with the surface over which it moves, and thus is more or less free from the detrimental effects incident to interposition of grit, and in the operation of such active element the face of the valve and the extended surface of the valve face is swept free of grit in the operation of opening and closing the valve, and there is no time in the operation of the mechanism at which seizure between the metal elements can take place.

To accomplish these results I provide a body casing having a through-way passage and in one of the ports of said casing I mount a removable valve seat with an extension in a direction radial from the axis of the port, and I provide said valve seat and the extension thereof with a face formed in one plane. I then provide a suitable sealing element to cooperate with said valve seat and its extension so that when the sealing element is moved out of registry with the port section of the valve seat it slides over the surface of said extension, said sealing element being constantly maintained by an elastic pressure against said surface or face of the valve seat and its extension.

I provide the casing also with a head from which are suspended all of the active elements of the valve, including the sealing member, and so arrange said active valve elements that when it is desired to disassemble the valve the first act of disassembling is a movement of the valve sealing element away from the valve seat or its extension in a direction at right angles to said valve seat or its extension, and in like manner when it is restored to operative position contact is made in a direction at right angles to such surface, thus avoiding any dangers that may be incident to a movement of the sealing element over said face in the act of assembling or disassembling the parts. A repair to the valve may be expeditiously made by removing the head and the valve operating mechanism, and then lifting out the valve seat which may, as illustrated in this construction, be entirely loose or it may, if desired, be secured in its position in the port, and when thus removed said valve seat may be replaced by another in perfect order, with a loose fit as previously stated or it may be subjected to a speedy repair and replaced. In like manner, the sealing element may be repaired or replaced, the construction being such that a repair to a valve of this nature may be accomplished with expedition and economy.

These, with other features of construction which will be obvious from the following drawings and description, present in a general way the objects of the invention.

This invention is illustrated in the accompanying drawings wherein:—

Figure 1 is an elevation of a gate valve embodying the present invention.

Figure 2 is a central section on the line 2—2 of Figure 1, showing the valve seat and the parts in operative positions.

Figure 3 is a section on the line 3—3 of Figure 2.

Figure 5 is a fragmental elevation of the lower end of the valve stem.

Figure 6 is a section on the line 6—6 of Figure 5.

Figure 7 is a section taken in the plane of the line 3—3 of Figure 2 and looking in the direction of the outlet port of the valve casing. This figure shows merely the lower section of the valve casing with the sealing member and valve stem removed, but with the seat member in operative position.

Figure 8 is a view similar to Figure 2, but showing a modified form of valve seat; and Figure 9 is a section on the line 9—9 of Figure 8.

In these drawings like parts are indicated by like numerals.

Figure 4:
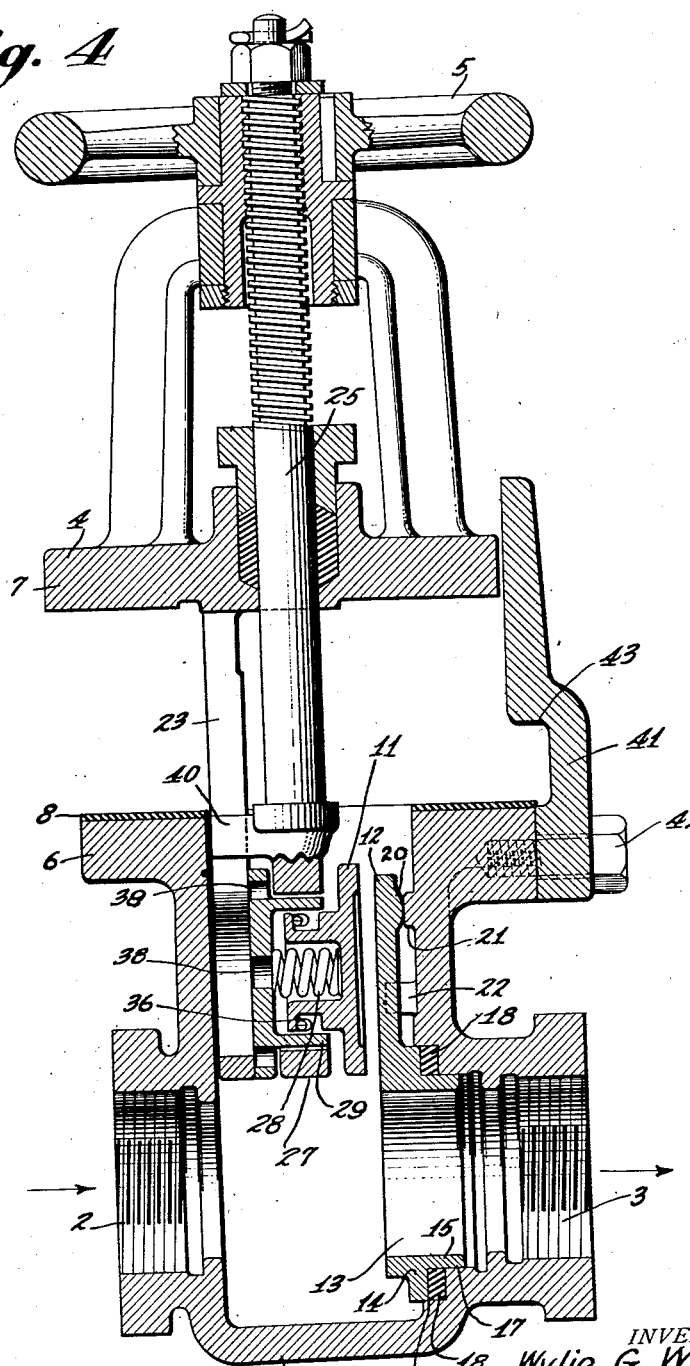
Figure 4 is a view corresponding to Figure 2, but showing the parts partially dismantled.

1 is a body section of the valve, the same being provided with a straight-way passage as 2 and 3. 4 is a head for the casing which is adapted to carry the active valve elements, and 5 is an operative hand wheel. 6 is a flange formed at the top of the body section 1 and 7 is a corresponding plate forming part of said head 4. 8 is packing interposed between said body and head sections. 9 represents retaining bolts and nuts, Figure 1, by which the head is secured to the body section. 13 is one of the port openings through the casing and valve seat. This port opening is annularly recessed or stepped as at 16 and 17 to receive a gasket 18 and the corresponding stepped sections of a removable valve seat 10. The valve seat is provided with annular stepped flanges as 14 and 15, all of which are adapted to cooperate with said corresponding stepped portions of the port opening 13 and are so constructed as to enclose between said stepped sections the gasket 18. The annular extension 15 of the seat 10 is adapted to fit snugly but loosely into the corresponding recessed portion 17 of the port 13 and is of sufficient depth to provide a support for the valve seat and to maintain the face thereof in approximately right-angular relation to the axis of the port 13, thus forming a means for holding the seat in its position in the port when the elastic pressure of the valve element is removed. In certain of the claims the valve seat employed is referred to as a loose valve seat and by this expression, or term, I desire to be understood as indicating that part, or structure, of my invention wherein a valve seat is held in its bearing loosely and readily removable by means of friction only or the closeness of the fit of extension 15 in the bearing or recess portion 17 of the port 13 in the casting 1; that is to say, as presently described, the valve seat can be removed with great facility, quickly and by hand, because it is loosely seated in its bearing, in contradistinction to being held in its bearing by screw-threads or binding screws, pins or other similar means calculated to hold the seat rigidly in place and requiring an implement to loosen it and remove it when desired or necessary. This term is also used in contradistinction to a valve seat which forms part of a valve casing and is not easily separable from the valve casing. Said valve seat is provided with an extension 19 in the direction of a radius emanating from the axis of the port 13; said extension is provided with a knob as 20 adapted to cooperate with a corresponding knob on the inside of the casing as 21, the knobs serving the purpose of maintaining the valve seat 10 in a predetermined position during the operation of the valve. It will be noted that under the construction shown in Figure 2 the valve seat is so mounted as to maintain the same as far as possible against tilting under the elastic pressure of the sealing element in its various positions. 22 are lugs extending from casting 1 adapted to limit the rotation of the valve seat on its axis. Said valve seat 10 is provided with a surface 12 which surface is extended in the same plane to include said extensions 19. 11 is a valve sealing element provided with a face 11ª which face is adapted to cooperate with the face 12 of the valve seat and its extension. From the back of said sealing element 11 protrudes an annular flange as 30, the same being provided with an annular channel as 36. 23 is a member dependent from the valve head 4 at right angles thereto, said dependent member having a face as 24 which face in the assembled valve arrangement takes a position in a plane parallel with the plane of the face of the removable valve seat 12. 25 is an operative stem suitably packed in the head 4. The plate 23 is provided with a longitudinal slot as 39 terminating in a port opening as 37. 40 is a lug emanating from the stem 25 adapted to reciprocate within the slot 39 and operating to prevent the rotation of the stem 25. 26 is a disk having a surface adapted to slide over the surface 24 of the dependent member 23. Said disk 26 is provided with an annular flange as 29 adapted to embrace the flange 30 of the sealing element 11. 27 is a ring attached to the lower end of the valve stem 25 adapted to embrace and include the valve sealing element 11 and the disk 26. 28 is a helical spring interposed between the disk 26 and the sealing element 11, adapted in its operation to maintain the sealing element against the face of the valve seat and thus to maintain the valve seat in position, at the same time operating to maintain the disk 26 against the face 24 of the dependent member 23. Said ring 27 and the sealing element 11 in the disk 26 are pierced by two sets of apertures 31, 31 and 34 and 35 in which are mounted cotter pins as 32 and 33. These serve the purpose of holding in assembled relation the sealing element 11 and the disk 26. The disk 26 is provided with openings as 38 which serve the purpose of permitting fluid to pass freely to bear upon the sealing element 11 and also serve as a means of indicating in the assembling of the parts the difference between the sealing element 11 and the disk 26. 41 is an arm provided with a shoulder as at 43, the same being secured to the body section at 42.

In Figures 8 and 9 there is illustrated a second form of construction, wherein all of the elements are the same with the exception of the form of the valve seat and the packing upon which the same is mounted. In this form of construction a suitable packing such as 44 is mounted in a recessed cavity surrounding one port in the valve casing and extending radially from the axis thereof. In like manner the loose valve seat in this instance is numbered 45, the same having a port opening as 46 and an extension 47 in a radius emanating from the axis of said port, said valve seat and its extension having a common surface corresponding to the surface 12 of the first construction.

In Figure 2 I have shown the valve assembled, whereas in Figure 4 I have shown it in the act of being disassembled. As previously stated, in the act of assembling and disassembling, I desire to limit the movement of the valve sealing element 11 in connection with the surface 12 of the removable valve seat, so that such movement shall be in a direction away from said surface 12. In order to accomplish this result and be sure that the same will be performed by unskilled labor I provide the overhanging arm 41 with a shoulder 43 which operates as follows: When the head 4 is released from the body of the casing, its upward movement will be limited by the shoulder 43, hence the operator will be compelled to move the same in a direction away from the surface of the valve seat 12, thus bringing the same into the position indicated in Figure 4; so in assembling the valve it will be necessary to introduce the active elements into the casing under conditions where the sealing element 11 is out of contact with the surface 12, and not until the head of the valve is seated on the body section of the casing can the same be moved transversely to bring the sealing element in contact with said surface 12.

When the active valve elements are removed from the casing through the opening at the top of the latter, the valve seat 10 may be removed for repair or replacement by merely inserting the hand in the opening at the top of the body casting 1 and drawing the seat member laterally and then upwardly, no implement of any kind being required for the purpose. In like manner, should repair be necessary to the sealing element 11, the cotter pins 32 and 33 may be withdrawn and said part may be repaired or replaced. Should it be found desirable to obtain access to the disk 26, the screw 25 can be run down until its lug 40 is at the bottom of the aperture 37 of the dependent member 23, at which time a rotation of said detent 40 out of engagement with the dependent member will permit the screw element 25 to be withdrawn and the disk 26 to be removed.

The sealing element 11 and its disk 26 are held as previously stated in assembled relation by the cotter pins 32 and 33, but the apertures in the sealing element and in the disk through which the cotter pins pass are made of such elliptical form as to permit a free movement between the said sealing element and the disk so that the operation of the spring 28 may be effective in compensating for any irregularities in the surface of the valve seat or in the surface of the dependent member so that a uniform and constant elastic pressure may be continuously active to hold the sealing element against the valve seat.

The operation of the valve will be obvious from the foregoing. When the parts are in the position shown in Figure 2 and it is desired to open the valve, the hand wheel 5 is rotated and the sealing element is thus moved over the face 12 of the valve and its extension, the same being held in contact with said face by reason of the spring pressure 28 bearing on the disk 26, which in turn moves on the surface 24 of the dependent member 23. Hence it will be seen that the surface 12 of the removable valve seat is swept by the movement of the sealing element 11 and the surface 11ª of the sealing element 11 is constantly kept in elastic engagement with the surface 12, thus sealing said surfaces where they make contact, and also preventing the interposition of grit or other foreign matter between the surfaces 11ª and 12. The elastic pressure occasioned by the spring 28 also operates to hold the removable valve seat in position on its gasket 18, thus accomplishing a seal. All that has been said with reference to the construction shown in Figure 2 applies with equal force and effect to the construction shown in Figure 8.

From the foregoing it will be seen that I have produced a valve structure in which all the active e'ements of the valve are carried on a head member or casting; that is to say, the valve or seal 11, disk 26, and pressure means 28 are carried by the stem 25, which is carried by and works in the head casting 4, 7, as previously stated. Also, it will be seen that the body casting comprises the flange 6, port members 2 and 3, and features 21 and 22, which are all integral and constitute a unit which, as before noted, can be placed as a fixture in the main pipe line and does not have to be removed for the purpose of repairs, substitution or replacement of either the seal 11 or valve seat 12, or any of the movable parts cooperative with said seal and seat. Notably, the body member or casting 1 has between the aligned inlet and outlet ports a well or deep recess in which the valve. or seal 11, its cooperating disk 26, the stem 25, the pendent member 23, and the valve seat may freely work when it is desired to remove any of the movable parts, and in which all said parts operate, stress being laid upon the fact that the integral casting 1 is so constructed that all the movable parts, including the loosely mounted valve seat, can be removed and replaced without the aid of implements or tools. These are important features of my invention upon which I desire to lay stress, and which are covered in the appended claims.

What I claim is:—

1. In a valve of the class described, a casing having a port opening and an opening at its top, a loose valve seat suitably mounted to cooperate with said port, said seat having a sealing face with an extension of such face in a common plane therewith between the port and top opening, a valve sealing element adapted to slide over said valve face and extension and means to operate the same, with means to cause said sealing element to bear on the face of said seat and its extension with an elastic pressure, and means to assemble and disassemble said valve elements comprising means to limit the movement of the sealing element under conditions of assembling or disassembling the valve to a movement respectively toward or away from the face of the valve seat or its extension.

2. In a valve of the class described, a casing having a port, a loose valve seat suitably mounted in said port in a plane at right angles to the axis of said port, said valve seat having a sealing face with an extension thereof in a plane at right angles to the axis of said port and between the port and top opening, a head for said casing, a member dependent from said head having a face in parallel relation when mounted to the face of the valve seat and its extension, a valve sealing means adapted to cooperate with the face of said valve seat and its extension, and slidable means adapted to cooperate with the face of said dependent member, with elastic means interposed between the last two elements to cause the same to bear upon the respective faces with which they are in contact with an elastic pressure, with means to operate said sealing elements by reciprocating the same between said faces.

3. In a valve of the class described, a body casing having a port, a loose valve seat having an extension, said seat and extension having a face in a common plane, said valve seat suitably mounted in association with said port with said surface at right angles to the axis of said port, a head for said casing and valve sealing elements carried by said head, means interposed between the body of the casing and its head to limit the movement of the sealing element in assembling or disassembling the valve to a movement away from or toward the surface of said valve seat and its extension.

4. In a valve of the class described, a casing comprising a body portion and a head, the body portion being formed as an integral casting, inlet and outlet ports formed in said body portion, a loose valve seat suitably mounted to cooperate with the outlet port, said seat having a sealing face with an extension of such face in a common plane therewith, a valve sealing element adapted to slide over said valve face and extension, and means to operate the same, with means to cause said sealing element to bear on the face of said seat and its extension with an elastic pressure, and means to assemble and disassemble said valve elements, comprising means to limit the movement of the sealing element, under conditions of assembling or disassembling the valve, to a movement respectively toward or away from the face of the valve seat or its extension.

5. In a valve of the class described, a casing comprising a body portion and a head, the body portion being formed as an integral casting, inlet and outlet ports formed in said body portion, a loose valve seat suitably mounted to cooperate with the outlet port, said seat having a sealing face with an extension of such face, a member dependent from said head having a face in parallel relation, when mounted, to the face of the valve seat and its extension, a valve sealing means adapted to cooperate with the face of the said valve seat and its extension, and slidable means adapted to cooperate with the face of the said dependent member, with elastic means interposed between the last two elements to cause the same to bear upon the respective faces with which they are in contact, with an elastic pressure, with means carried by said head to operate said sealing elements by reciprocating the same between the said faces.

6. A valve structure having, in combination, a head having a stem and means adapted to reciprocate the stem therein; a body member having inlet and outlet ports and an opening through which parts of the valve structure may be removed; a valve structure mounted on said stem; a member cooperative with the valve structure carried by said head; a valve seat loosely mounted at one of the ports; and means adapted to force the seal of the valve structure against the valve seat and a cooperative member of the valve structure against the said head member.

7. In a gate valve, a suitable casing provided with ports and having an opening through which valve elements may be introduced into and removed from the casing, a head normally closing said opening, a valve seat member provided with a sealing face and loosely seated in one of said ports, a guide member carried by the head and extending into the interior of the casing and provided with a face parallel to the sealing face of the valve seat member, a sealing element adapted for sliding coaction with said sealing face, another element adapted for sliding coaction with the parallel face of the guide member, elastic means interposed between said elements for maintaining them in engagement with the respective faces, and means, carried by the head, for imparting sliding movement to said elements.

Signed by me at New York, N. Y., this 1st day of May, 1922.

WYLIE G. WILSON.